United States Patent
Peleg et al.

(10) Patent No.: US 8,949,235 B2
(45) Date of Patent: *Feb. 3, 2015

(54) METHODS AND SYSTEMS FOR PRODUCING A VIDEO SYNOPSIS USING CLUSTERING

(75) Inventors: Shmuel Peleg, Mevaseret Zion (IL); Yael Pritch, Jerusalem (IL); Sarit Ratovitch, Jerusalem (IL); Avishai Hendel, Tel-Aviv (IL)

(73) Assignee: Yissum Research Development Company of The Hebrew University of Jerusalem Ltd., Jerusalem (IL)

( * ) Notice: Subject to any disclaimer, the term of this patent is extended or adjusted under 35 U.S.C. 154(b) by 480 days.

This patent is subject to a terminal disclaimer.

(21) Appl. No.: 12/623,217

(22) Filed: Nov. 20, 2009

(65) Prior Publication Data

US 2010/0125581 A1 May 20, 2010

Related U.S. Application Data

(63) Continuation-in-part of application No. 12/093,684, filed as application No. PCT/IL2006/001320 on Nov. 15, 2006, now Pat. No. 8,102,406, application No. 12/623,217, which is a continuation-in-part of (Continued)

(51) Int. Cl.
*G06F 17/30* (2006.01)
*G06K 9/00* (2006.01)
*G06F 7/00* (2006.01)

(52) U.S. Cl.
CPC ...... *G06K 9/00751* (2013.01); *G06F 17/30811* (2013.01); *G06F 17/30814* (2013.01); *G06F 17/30843* (2013.01); *Y10S 707/914* (2013.01)

USPC .......... 707/737; 707/711; 707/725; 707/914; 345/629

(58) Field of Classification Search
USPC ........... 707/999.001–999.206, 711, 725, 737, 707/914
See application file for complete search history.

(56) References Cited

U.S. PATENT DOCUMENTS

| | | | |
|---|---|---|---|
| 5,768,447 A | 6/1998 | Irani et al. | |
| 5,774,593 A * | 6/1998 | Zick et al. | 382/236 |
| 5,900,919 A * | 5/1999 | Chen et al. | 348/700 |

(Continued)

FOREIGN PATENT DOCUMENTS

| | | |
|---|---|---|
| CN | 1444398 | 9/2003 |
| CN | 1459198 | 11/2003 |

(Continued)

OTHER PUBLICATIONS

Agarwala et al., "Panoramic Video Textures", ACM SIGGRAPH 2005 Conference Proceedings.

(Continued)

*Primary Examiner* — Jung Kim
*Assistant Examiner* — James J Wilcox
(74) *Attorney, Agent, or Firm* — Pearl Cohen Zedek Latzer Baratz LLP

(57) ABSTRACT

Computer-implemented method, system, and techniques for summarization, searching, and indexing of video are provided, wherein data related to objects detected in the video in a selected time interval is received and the objects are clustered into clusters such that each cluster includes objects that are similar in respect to a selected feature or a combination of features. A video summary is generated based on the computed clusters.

12 Claims, 6 Drawing Sheets

Related U.S. Application Data application No. 12/522,843, filed as application No. PCT/IL2007/001520 on Dec. 9, 2007, now Pat. No. 8,311,277.

(60) Provisional application No. 60/736,313, filed on Nov. 15, 2005, provisional application No. 60/759,044, filed on Jan. 17, 2006, provisional application No. 61/116,646, filed on Nov. 21, 2008, provisional application No. 60/898,698, filed on Feb. 1, 2007, provisional application No. 60/911,839, filed on Apr. 13, 2007, provisional application No. 60/971,582, filed on Sep. 12, 2007.

(56) References Cited

U.S. PATENT DOCUMENTS

| | | | |
|---|---|---|---|
| 5,911,008 A * | 6/1999 | Niikura et al. | 382/236 |
| 6,195,497 B1 * | 2/2001 | Nagasaka et al. | 386/200 |
| 6,549,643 B1 * | 4/2003 | Toklu et al. | 382/107 |
| 6,654,019 B2 | 11/2003 | Gilbert et al. | |
| 6,665,003 B1 | 12/2003 | Peleg et al. | |
| 6,665,423 B1 * | 12/2003 | Mehrotra et al. | 382/107 |
| 6,697,523 B1 * | 2/2004 | Divakaran et al. | 382/173 |
| 6,735,253 B1 * | 5/2004 | Chang et al. | 375/240.16 |
| 6,879,332 B2 * | 4/2005 | Decombe | 715/764 |
| 6,925,455 B2 * | 8/2005 | Gong et al. | 706/45 |
| 6,961,731 B2 * | 11/2005 | Holbrook | 1/1 |
| 6,961,732 B2 | 11/2005 | Hellemann et al. | |
| 7,016,540 B1 * | 3/2006 | Gong et al. | 382/225 |
| 7,027,509 B2 * | 4/2006 | Jun et al. | 375/240.16 |
| 7,046,731 B2 * | 5/2006 | Wu et al. | 375/240.16 |
| 7,110,458 B2 * | 9/2006 | Divakaran et al. | 375/240.25 |
| 7,127,127 B2 | 10/2006 | Jojic et al. | |
| 7,143,352 B2 * | 11/2006 | Divakaran et al. | 715/721 |
| 7,149,974 B2 | 12/2006 | Girgensohn et al. | |
| 7,151,852 B2 * | 12/2006 | Gong et al. | 382/173 |
| 7,289,138 B2 * | 10/2007 | Foote et al. | 348/36 |
| 7,406,123 B2 * | 7/2008 | Peker et al. | 375/240.16 |
| 7,424,204 B2 * | 9/2008 | Nakamura | 386/45 |
| 7,480,864 B2 * | 1/2009 | Brook et al. | 715/720 |
| 7,594,177 B2 * | 9/2009 | Jojic et al. | 715/720 |
| 7,635,253 B2 | 12/2009 | Garcia-Ortiz | |
| 7,716,220 B2 * | 5/2010 | Michelitsch et al. | 707/736 |
| 2002/0051077 A1 * | 5/2002 | Liou et al. | 348/465 |
| 2003/0046253 A1 * | 3/2003 | Shetty et al. | 706/1 |
| 2004/0019608 A1 * | 1/2004 | Obrador | 707/104.1 |
| 2004/0085323 A1 * | 5/2004 | Divakaran et al. | 345/581 |
| 2004/0128308 A1 * | 7/2004 | Obrador | 707/102 |
| 2005/0249412 A1 * | 11/2005 | Radhakrishnan et al. | 382/173 |
| 2006/0083440 A1 | 4/2006 | Chen | |
| 2006/0117356 A1 | 6/2006 | Jojic et al. | |
| 2007/0169158 A1 | 7/2007 | Folgner et al. | |
| 2008/0208828 A1 | 8/2008 | Boiman et al. | |
| 2009/0219300 A1 | 9/2009 | Peleg et al. | |
| 2009/0237508 A1 | 9/2009 | Arpa et al. | |
| 2010/0036875 A1 | 2/2010 | Miezianko et al. | |
| 2010/0092037 A1 | 4/2010 | Peleg et al. | |

FOREIGN PATENT DOCUMENTS

| | | |
|---|---|---|
| JP | 2004336172 A | 11/2004 |
| JP | 2005210573 | 8/2005 |
| JP | 2006-24210 | 1/2006 |
| JP | 2006-024210 | 1/2006 |
| JP | 2006-58874 | 3/2006 |
| JP | 2006-058874 | 3/2006 |
| KR | 10-1999-0006678 | 1/1999 |
| WO | 0178050 A2 | 10/2001 |
| WO | 2004040480 | 5/2004 |
| WO | 2006048875 | 5/2006 |
| WO | 2006048875 A2 | 5/2006 |
| WO | 2007057893 A2 | 5/2007 |
| WO | WO 2007/057893 | 5/2007 |
| WO | 2008093321 A1 | 8/2008 |

OTHER PUBLICATIONS

Freeman et al., "Motion Without Movement", The Media Library, Massachusetts Institute of Technology, Computer Graphics, vol. 25, No. 4, Jul. 1991.

Irani et al., Efficient Representations of Video Sequences and Their Applications, Signal Processing; Image Communication, 8(4):327-351, 1996.

Liu et al., "Combined Key-frame Extraction and Object-based Video Segmentation", p. 1-30, IEEE Transactions on Circuits and Systems for Video Technology, vol. 15, No. 7, Jul. 2005.

Pal et al., Interactive Montages of Sprites for Indexing and Summarizing Security Video, In Video Proceedings of CVPR05, p. 11: 1192, 2005.

Rav-Acha, et al., Dynamosaics: Video Mosaics with Non-Chronological Time, Proceedings of the 2005 IEEE Computer Society Conference on Computer Vision and Pattern Recognition (CFPR'05) 1063-6919/05.

Peleg, et al., Dynamic Video Synopsis, U.S. Appl. No. 60/736,313, filed Nov. 15, 2005, 11 Pages.

Rav-Acha, et al., Dynamic Video Editing, U.S. Appl. No. 60/759,044, filed Jan. 17, 2006, 9 pages.

Peleg, A Global Webcam Service, U.S. Appl. No. 60/898,698, filed Feb. 1, 2007, 5 Pages.

Peleg, et al., Webcam Synopsis, U.S. Appl. No. 60/911,839, filed Apr. 13, 2007, 17 Pages.

Peleg, et al., Video Synopsis and Indexing, U.S. Appl. No. 60/971,582, filed Sep. 12, 2007, 43 pages.

Peleg, et al., Clustered Synopsis, U.S. Appl. No. 61/116,646, filed Nov. 21, 2008, 18 Pages.

Rav-Acha, et al., Making a Long Video Short: Dynamic Video Synopsis, School of Computer Science Engineering the Hebrew University of Jerusalem 91904 Jerusalem, Israel, Proceedings of the 2006 IEEE Computer Society Conference on Computer Vision and Pattern Recognition (CVPR'06), 0-7695-2597-0/06, 7 Pages.

Piet, Mourik, European Patent Office, International Preliminary Report on Patentability for PCT/IL2007/001520, completed May 20, 2009, 14 Pages.

Baharlou, Simin, The International Bureau of WIPO, International Preliminary Report on Patentability for PCT/IL2006/001320, issued May 20, 2008, 8 Pages.

Office Action issued on Jul. 5, 2011, for JP application No. 2008-539616.

Australian Office Action dated Feb. 24, 2012 received in corresponding patent application No.: 2006314066.

Chinese Office Action dated Jan. 10, 2012 received in corresponding patent application No.: 200680048754.8 and English language translation.

Chinese Office Action dated May 11, 2012 received in corresponding patent application No.: 200780050610.0 and English language translation.

U.S. Appl. No. 60/971,582, filed Sep. 12, 2008, Peleg et al.
U.S. Appl. No. 60/736,313, filed Nov. 15, 2005, Peleg et al.
U.S. Appl. No. 60/759,044, filed Jan. 17, 2006, Rav-Achva et al.
U.S. Appl. No. 60/898,698, filed Feb. 1, 2007, Peleg et al.
U.S. Appl. No. 60/911,839, filed Apr. 13, 2007, Peleg et al.

Rav-Achva et al., "Dynamosaics: video mosaics with Non-Chronological time", IEEE Computer society conference on computer vision and pattern recognition CVPR 2005, San Deigo, CA, USA Jun. 20-26, 2005, IEEE CS, Jun. 20, 2005, pp. 58-65.

Liu, Iljie et al. "Combined Key-Frame Extraction and Object-based Video Segmentation", p. 1-30, 2005.

Agarwala et al. "Interactive Digital Photomontage". In SIGGRAPH. pp. 294-302, 2004.

Assa et al. "Action synopsis: pose selection and illustration", in SIGGRAPH, pp. 667-676, 2005.

Boiman et al. "Detecting irregularities in images and in video", on ICCV, pp. 1:462-469, Beijing 2005.

Ferman et al. "Multiscale Content Extraction and Representation for Video Indexing", Proc. Of SPIE, 3229:23-31, 1997.

(56) References Cited

OTHER PUBLICATIONS

Irani et al. "Efficient Representation of Video Sequences and their Applications. Signal Proceeding: Image Communication", 8(4):327-351, 1996.

Kim et al. "An integrated Scheme for Object-Based Video Abstraction", in ACM Multimedia, pp. 303-311, New-york, 2000.

Kirkpatrick et al. "Optomization by Simulated Annealing", Science, 4598(13):671-680, 1983.

Kolomogorov et al., "What Energy Functions can be Minimized via Graph Cuts", in ECCV, pp. 65-91, 2002.

Li et al., "An Overview of Video Abstraction Techniques", Technical Report HPL-2001-191, HP Laboratory, 2001.

Oh et al., "Video Abstraction", In S. Deb, Editor, Video Date Management and Information Retrieval, pp. 321-346. Idea Group Inc. and IIRM Press, 2004.

Pal et al., "Interactive Montages of Sprites for Indexing and Summarizing Security Video", In Video Proceedings of CVPR05 pp. II:1192, 2005.

Smith et al., "Video Skimming and Characterization through the Combination of Image and Language Understanding", CAVID, pp. 61-70, 1998.

Zhong et al., "Detecting Unusual Activity in Video", In CVPR, pp. 819-826, 2004.

Zhu et al., "Exploring Video Content Structure for Hierarchical Summarization", Multimedia Syst., 10(2):98-115, 2004.

Kim et al., "Fast and Automatic Video Object Segmentation and Tracking for Content-based Application", IEEE Transactions on Circuits and System for Video Technology, vol. 12. No. 2. Feb. 2002, pp. 122-129.

Rav-Achva et al., "Making a Long Video Short: Dynamic Video Synopsis", Coputer Vision and Pattern Recognition 2006 IEEE Computer Society Conference on New York, NY, USA, Jun. 17-22, 2006, pp. 435-441, XP010922851, ISBN: 0-7695-2597-0.

Freeman et al., "Motion without Movement", the Media Laboratory, Massachusetts Intitute of Technology, 1991, p. 1-4.

Agarwala et al., "Panoramic Video Textures", in SIGGRAPH, pp. 821-827, 2005.

Office Action of Canadian Application No. 2,640,834 Dated Jun. 3, 2013.

Search Report of PCT Application No. PCT/IL2006/001320 dated Jun. 1, 2007.

International Preliminary Report on Patenatability of PCT Application No. PCT/IL2006/001320 dated May 20, 2008.

Office Action of Israeli Application No. 191232 dated Dec. 28, 2011.

Office Action of Israeli Application No. 191232 dated May 23, 2012.

Office Action of Japanese Application No. 2009-266870 dated May 7, 2013.

Office Action of Korean Application No. 10-2008-7014270 dated Mar. 27, 2013.

Yabushita et al., "Fruits Movie: a Summarization and Visualization Technique for Collection of Paths", Collected Papers for the 70th (2008) National Convention of IPSJ (4), Information Processing Society of Japan, vol. 28. Suppl. 2. Mar. 13, 2008, pp. 4-327 to 4-328.

Notice of Allowance of Japanese Patent Application No. 2009-266870 dated Nov. 26, 2013.

\* cited by examiner

FIG. 4a
FIG. 4b
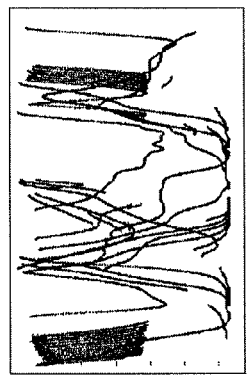
FIG. 4c
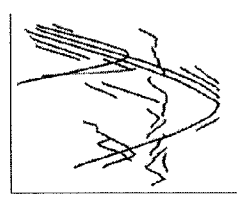
FIG. 4d
FIG. 5a
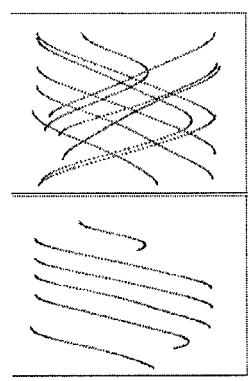
FIG. 5b
FIG. 5c
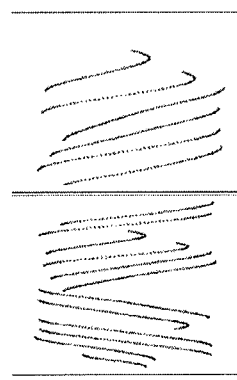
FIG. 5d

METHODS AND SYSTEMS FOR PRODUCING A VIDEO SYNOPSIS USING CLUSTERING

RELATED APPLICATIONS

This application is a continuation-in-part application of U.S. Ser. No. 12/093,684, now U.S. Pat. No. 8,102,406 B2, "Method and System for Producing a Video Synopsis" (Peleg et al.) filed Oct. 8, 2008, which is a 371 of international application number PCT/IL06/01320 "Method and System for Producing a Video Synopsis" (Peleg et al.) filed Nov. 15, 2006, which claims the benefit of U.S. Ser. No. 60/736,313 "Dynamic Video Synopsis" (Peleg et al.) filed Nov. 15, 2005 and claims the benefit of U.S. Ser. No. 60/759,044 "Dynamic Video Editing" (Rav-Acha et al.) filed Jan. 17, 2006. This application is also a continuation-in-part application of U.S. Ser. No. 12/522,843, now U.S. Pat. No. 8,311,277 B2, "Method and System for Video Indexing and Video Synopsis" (Peleg et al.) filed Jul. 10, 2009, which is a 371 of international application number PCT/IL07/01520 "Method and System for Video Indexing and Video Synopsis" (Peleg et al.) filed Dec. 9, 2007, which claims the benefit of U.S. Ser. No. 60/898,698 "A Global Webcam Service" (Peleg et al.) filed Feb. 1, 2007 and claims the benefit of U.S. Ser. No. 60/911,839 "Webcam Synopsis" (Peleg et al.) filed Apr. 13, 2007 and claims the benefit of U.S. Ser. No. 60/971,582 "Video Synopsis and Indexing" (Peleg et al.) filed Sep. 12, 2007. This application further claims the benefit of U.S. Ser. No. 61/116,646 (Peleg et al.) filed Nov. 21, 2008. The contents of all the aforementioned applications are incorporated herein by reference in their entireties.

TECHNICAL FIELD

The present disclosure relates to methods, systems, and techniques in the field of video summarization and video indexing.

BACKGROUND

Video surveillance cameras have become very popular owing to the low cost of video cameras and disk storage used to record the video and the availability of networked cameras allowing a simple video transfer over the network. Costs have become so affordable that people even install surveillance cameras in private homes. The video generated from most surveillance cameras is recorded in huge video archives.

Most installed video cameras record the video in DVRs (Digital Video Recorders) or NVRs (Network Video Recorders). Normally, no one views the recorded video. Finding activities in video archives presents a significant problem. Automated video analysis approaches for finding activities of interest are making continuous progress, but are still far from giving satisfying solutions. Summarization methods enable more efficient human browsing in video [8, 11], but create summaries that are either too long or are confusing.

Video analytics systems, which aim at understanding surveillance video, are useful in providing simple alerts. Automatic methods to detect entrance into areas that should be off limits, or to detect crossing from one image region to another image region, provide accurate alerts with almost no errors. But many cases are still too difficult even for the best video analytics systems, while a human observer could have made a fast and accurate decision. Despite much research on the detection of suspicious behavior, for example, human performance is still much better than automatic decisions.

Many different approaches have been proposed for video summarization. Most methods generate a static description, usually as a set of keyframes. Other methods use adaptive fast forward [7, 1], skipping irrelevant periods.

WO 07/057893 (Rav-Acha et al.) discloses a method for creating a short video synopsis of a source video wherein a subset of video frames is obtained in a source sequence that show movement of at least one object that is a connected subset of pixels from at least three different frames of the source video. At least three source objects are selected from the source sequence, and one or more synopsis objects are temporally sampled from each selected source object. For each synopsis object a respective display time is determined for starting its display in the synopsis video, and the video synopsis is generated by displaying selected synopsis objects each at its respective predetermined display time without changing the spatial location of the objects in the imaged scene such that at least three pixels, each derived from different respective times in the source sequence, are displayed simultaneously in the synopsis video.

WO 08/004222 describes an extension to this approach that is adapted for the generation of a video synopsis from a substantially endless source video stream as generated by a video surveillance camera. Object-based descriptions of at least three different source objects in the source video stream are received in real time, each source object being a connected subset of image points from at least three different frames of the source video stream. A queue of received object-based descriptions is continuously maintained and includes for each respective source object its duration and location. A subset of at least three source objects is selected from the queue based on given criteria, and one or more synopsis objects are temporally sampled from each selected source. For each synopsis object a respective display time for starting its display in the video synopsis is determined, and the video synopsis is generated by displaying selected synopsis objects or objects derived therefrom each at its respective predetermined display time, such that at least three points, each derived from different respective times in the source video stream, are displayed simultaneously in the synopsis video and at least two points, both derived from the same time, are displayed at different times in the video synopsis.

WO 08/004222 also discloses indexing the video synopsis by clustering objects into clusters of similar objects. This facilitates browsing of the video synopsis and may be done using any clustering method, for example by building an affinity (similarity) matrix based on some similarity measure between every pair of objects.

SUMMARY OF THE INVENTION

According to one aspect of the present invention there is provided method of summarizing a source video sequence. The method may include the following steps: receiving features descriptive of selected source objects presented in the source video sequence over a selected time interval, wherein the source objects represent moving objects appearing in the source video; clustering the source objects into clusters such that each one of the clusters includes source objects that are similar in respect to one of the features or a combination of the features; and generating a synopsis video sequence, based on the clusters, wherein the synopsis video sequence presents simultaneously temporally sampled source objects that: (i) relates with one of the clusters, and (ii) appear at different times in the source video sequence.

BRIEF DESCRIPTION OF THE DRAWINGS

In order to understand the present disclosure and to see how it may be carried out in practice, embodiments will now be described, by way of non-limiting examples only, with reference to the accompanying drawings, in which:

FIGS. 4a to 4d show selection of similar objects using a nearest neighbor approach;

FIGS. 5a to 5d show motion trajectories of objects;

DETAILED DESCRIPTION

Figures 1A, 1B:
FIGS. 1a to 1d shows results of unsupervised spectral clustering using appearance features for a video from the PETS database.

Embodiments of the present disclosure provides an improved clustering method, system, and technique that may be used with any type of video synopsis technique, regardless of whether the video synopsis is finite or substantially endless.

These aspects may be realized by a method for summarization, searching, and indexing of video, said method comprising:

receiving data related to objects detected in the video in a selected time interval;

clustering objects into clusters such that each cluster includes objects that are similar in respect to a selected feature or a combination of features; and generating a video summary based on the computed clusters.

The techniques described herein build upon video summarization approaches that simultaneously display activities which originate from different times. These methods tend to create confusing summaries by mixing together different activities, and the techniques described herein propose prior clustering of the activities into similar clusters. Such an approach achieves three benefits for video summaries: (i) similar activities pack together more efficiently into shorter video summaries; (ii) these summaries are very clear, as it is easy to view multiple similar activities; (iii) irregular activities are easier to detect. In addition to simple video summarization, clustered summaries can help in structured browsing of objects, and in preparing samples for training classifiers. The accuracy of classifiers can be checked as well on thousands of objects.

Activities

The basic element used by embodiments of the video summarization system described herein is an activity, which is simply a dynamic object. The object is detected in a sequence of frames, and each activity is therefore represented by a sequence of object masks in those frames. In addition to the object mask in each frame, an object has a rectangular bounding box called the ROI (Region of Interest). The information for each activity $A_i$ includes the following:

$$A_i = (t_s^i, t_e^i, \{M_t^i, R_t^i\}_{t_s \le t \le t_e}) \quad (1)$$

where $t_s$ and $t_e$ are the start and end frames for this activity, $M_t$ is the object mask for frame t which includes pixel colors, and Rt is the ROI for frame t.

Activity Extraction

Any method that can produce the activity description of object masks along video frames as in Eq. (1) is suitable for clustered summarization. There are numerous methods that segment moving objects fairly well. In one embodiment, a simplification of [9] was used to compute activities. This method combines background subtraction together with mincut to get segmentation of moving objects. But other methods for the detection of moving objects are also suitable.

Tubelets: Short Activity Segments

In order to enable the analysis of objects performing multiple activities, objects can be broken into sub-parts called "tubelets". Tubelets have a predefined maximal length (one embodiment uses 50 frames), and can overlap with other tubelets (one embodiment uses 50% overlap between tubelets). The division into tubelets has the following benefits:

Activities vary substantially in length. By breaking into tubelets activities of similar lengths can be compared.

Long activities may be composed from parts having different dynamics. Tubelets are more likely to have a single, simple, motion.

Different objects may intersect in the video frames, creating complex activities composed from different objects. Most tubelets include a single object since they are shorter.

After clustering the tubelets, overlapping tubelets that were clustered together are merged into a longer activity.

Activity Features

Features that can be used for clustering include appearance (image) features and motion features. SIFT (Scale-invariant feature transform) descriptors [5] were found to be highly discriminative, and in one embodiment SIFT descriptors were used as appearance features. For each object, multiple SIFT features are computed inside the object masks in the relevant frames. This large collection of SIFT features can be used to estimate appearance similarity between objects. For efficiency, we can randomly select a predetermined number of features for the initial unsupervised clustering. In some embodiments reduced to practice, 200 SIFT features were selected from each activity.

For representing the motion of objects, a smooth trajectory from the center of the object is used. The trajectory of an object (activity) $A_i$ is a sequence of frame by frame features, including for every frame t at least three features: $x_t^i, y_t^i, r_t^i$ which represent the x, y coordinates of the centroid of the object, as well as the radius of the object. Shorter motion descriptors can be used by sampling fewer frames from the activity.

Similarity Between Activities

In order to cluster together similar activities, a distance metric between activities is needed. A symmetric distance between activities is needed for use in spectral clustering that will be used in Sec. 3.3. In one embodiment, a distance used is based on two components, as described in this section: (i)

Features that are derived from the shape of the objects (Eq. 2), and features that are derived from the motion of the objects (Eq. 6).

Appearance Distance

For the appearance distance between two activities the NN (Nearest Neighbor) estimate computed from the distance between their SIFT descriptors can be used. A simple squared distance can be used as a distance between SIFT descriptors, but other distances such as the distance proposed in [5] can be used as well. Let $S_k^i$ be the k's SIFT descriptor of activity $A_i$, and let $\tilde{S}_k^j$ be the SIFT descriptor in $A_j$ closest to $S_k^i$. Similarly, $\tilde{S}_k^i$ is the closest descriptor in $A_i$ to $S_k^j$.

The appearance distance $Sd_{ij}$ between activities $A_i$ and $A_j$ is:

$$Sd_{ij} \frac{1}{2N} \left( \sum_k |S_k^i - \tilde{S}_k^j| + \sum_k |S_k^j - \tilde{S}_k^i| \right) \quad (2)$$

where N is the number of SIFT descriptors in each activity. This measure follows the nearest neighbor distance promoted in [2], which has been found to be very effective in experiments.

3.2. Motion Distance

Motion similarity between two activities is especially useful for the construction of summaries that display simultaneously multiple objects. Given two activities $A_i$ and $A_j$, a motion distance is computed between them for all temporal shifts k of $A_j$. Let $l_x$ be the time length of activity $A_x$, let $T_{ij}(k)$ be the time period common to $A_i$ and to $A_j$ after the latter has been temporally shifted by k, and let $$w(k) = \frac{\min(l_i, l_j)}{T_{ij}(k)} \quad (3)$$

be a weight encouraging a long temporal overlap between temporally shifted activities.

The separation between the activities is:

$$Sep_{ij}(k) = \sum_{t \in T_{ij}(k)} \left[ (x_t^i - x_{t+k}^j)^2 + (y_t^i - y_{t+k}^j)^2 \right] \quad (4)$$

The motion distance between $A_i$ and the shifted $A_j$ is defined as follows:

$$Md_{ij}(k) = \frac{w(k)}{T_{ij}(k)} sep_{ij}(k) \quad (5)$$

The elements in the motion distance $Md_{ij}(k)$ minimize the spatial separation between the activities (4), and increase the temporal overlap between the activities as represented by w (3). Dividing by the temporal overlap $T_{ij}(k)$ is a normalization to a "per frame" measure.

When the motion distance between two activities should not depend on the object location in the image, the two centroids are computed for the respective activities in $T_{ij}(k)$, the time period common to the two activities. The two objects are spatially shifted to a common centroid before computing $Md_{ij}(k)$ (Eq. 5). The final motion distance between $A_i$ and $A_j$ is a minimum over all temporal shifts k:

$$Md_{ij} = \min_k Md_{ij}(k) \quad (6)$$

3.3. Unsupervised Clustering

For unsupervised clustering, a distance measure $D_{ij}$ defined between activities $A_i$ and $A_j$ from the appearance distance $Sd_{ij}$ (Eq. 2) and the motion distance $Md_{ij}$ (Eq. 6) can be used.

$$D_{ij} = \alpha Sd_{ij} + (1-\alpha)Md_{ij} \quad (7)$$

The parameter α controls the preference between motion and appearance. From Dij an affinity matrix M is generated:

$$M(i,j) = M(j,i) = \exp(-D_{ij}/\sigma) \quad (8)$$

where σ is a constant scale factor used for normalization. The normalized-cut approach [10] is used to cluster the data given the affinity matrix M. Doubly stochastic normalization of the input affinity matrix can be used to improve spectral clustering results as proposed by [12]. Examples showing the results of clustering are shown in FIGS. 1 and 2 both of which show results of unsupervised spectral clustering using appearance and motion.

Figures 1C, 1D:
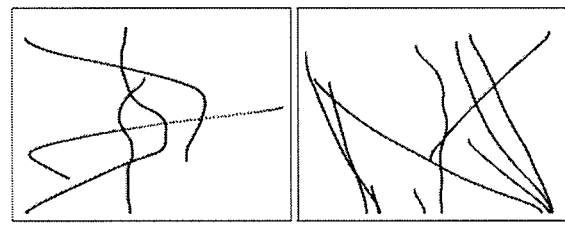

In FIGS. 1a to 1d, the people and cars are separated well into two clusters, one cluster for people and another cluster for cars. FIGS. 1a and 1b show two frames from the two summaries each made from a different single cluster, the cluster of FIG. 1a being composed of cars and the cluster of FIG. 1b being composed of people. FIGS. 1c and 1d show corresponding motion paths of the objects in the displayed cluster, each object being shown as a curve in x-t.

Figures 2A, 2B:
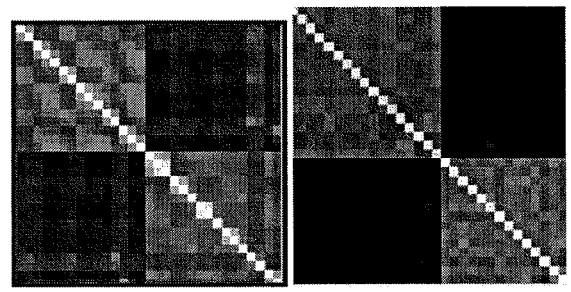
FIGS. 2a to 2f show results of unsupervised spectral clustering using appearance and motion.
Figures 2C, 2D:
Figures 2E, 2F:
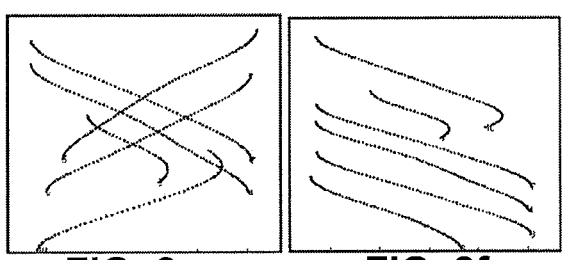

In FIGS. 2a-f, the left column uses only the appearance features, and the right column uses only the motion features. FIGS. 2a and 2b show affinity matrices after clustering to two classes. FIGS. 2c and 2d each show an image from a summary generated from one cluster. FIGS. 2e and 2f show motion paths of the objects in the displayed cluster, each object being shown as a curve in x-t. The shape cluster (left) picks up objects having uniform appearance as shown in FIGS. 2c and 2d, while the motion cluster (right) picks up objects having similar motion shown in FIGS. 2e and 2f.

Performing unsupervised clustering on one set of features can be followed by taking the resulting clusters, and on each cluster performing clustering using a different set of features. This is shown in FIG. 3, where two SIFT clusters were first generated, and on each SIFT cluster motion clustering has been applied. This resulted in four clusters, each having different appearance and motion.

Figures 3A, 3B:
FIGS. 3a to 3l show performing two steps of unsupervised spectral clustering.
Figures 3C, 3D:
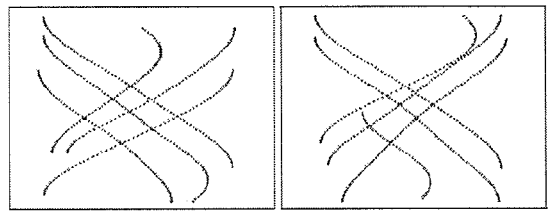
Figures 3E, 3F:
Figures 3G, 3H:
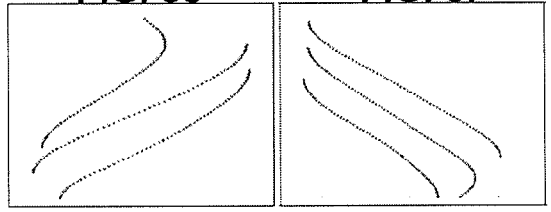
Figures 3I, 3J:
Figures 3K, 3L:
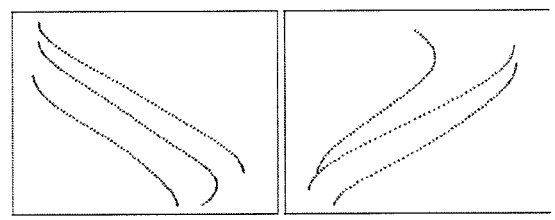

FIGS. 3a and 3b show two SIFT-based clusters, with a good separation between the man and the woman. FIGS. 3c and 3d shows the respective motion paths of the clusters in FIGS. 3a and 3b as curves in x-t. FIGS. 3e to 3h show further clustering on the man cluster using motion features. The man walking left and the man walking right are the two new clusters. FIGS. 3i to 3l show further clustering on the woman cluster using motion features. The woman walking left and the woman walking right are the two new clusters.

4. Creating Summaries

Given a set of objects or activities, a summarization video can be generated displaying these objects with minimal length and minimum collisions between them.

This is done by assigning each object its start play time in the summary. This mapping from objects to play times can be performed in three stages:

1. Objects are clustered based on the packing cost (Eq. 11) defined in Section 4.1.
2. Play time is assigned to objects within each cluster.
3. Play time is assigned to each cluster.

These steps will be described in detail in this section. Once each object is assigned its play time, the output summary can be generated by playing the objects over the background at the assigned times. For example, the video used in FIGS. 1a and 1b was originally 5 minutes long, and using clustered synopsis the summary including all activities is about 20 seconds long.

Another example for simple browsing of surveillance video is shown in FIGS. 4a to 4c where similar objects are selected using a nearest neighbor approach. In viewing the video, users typically prefer to watch only the people, or only the cars. The fastest approach is to select a few objects in the desired class, and pick up appropriate similar objects using a nearest neighbor approach, and display them in a video summary.

FIG. 4a shows objects found to be closest to two selected cars, while FIG. 4b shows objects found to be closest to two selected people. FIG. 4c shows motion trajectories of the cars in the summary and FIG. 4d shows motion trajectories of the people in the summary.

4.1. Packing Cost

The packing cost between two activities generally should indicate how efficiently the activities can be played together. The activities should have similar motion, and for some temporal shift they should play simultaneously with minimal collisions and with minimal increase of the length of the video.

The packing cost is very similar to the motion distance in Sec. 3.2, with the following modifications (i) There is no spatial shift of the activities. (ii) A collision cost $Col_{ij}(k)$ is added between objects, defined as follows:

$$Col_{ij}(k) = \sum_{t \in T_{ij}(k)} |(x_t^i - x_{t+k}^j)^2 + (y_t^i - y_{t+k}^j)^2 < (r_t^i)^2 + (r_{t+k}^j)^2| \qquad (9)$$

where $r_t^i$ is the radius of object $A_i$ in frame t, and $r_{t+k}^j$ is the radius of $A_j$ in frame t+k. $Col_{ij}(k)$ counts the number of collisions for the temporal shift k, where a collision occurs when the separation between the object centers is smaller than the sum of the radiuses of the two objects.

The packing cost for temporal shift k is defined using the motion distance (5) and the collision cost (9):

$$Pk_{ij}(k) = \alpha Md_{ij}(k) + \beta Col_{ij}(k) \qquad (10)$$

Finally, the packing cost for the two activities is the minimum over all temporal shifts:

$$Pk_{ij} = \min_k Pk_{ij}(k) \qquad (11)$$

The packing cost $Pk_{ij}$ between two objects is used for clustering before arrangement into the video summary. FIG. 5 is an example for the clustering into three clusters of a set of objects based on the packing cost.

FIG. 5a shows motion trajectories of all input objects as curves in x-t. FIGS. 5b-5c show motion trajectories of two clusters using the packing cost. FIG. 5d shows motion trajectories of a complete summary. It should be noted that there are no confusing intersections.

4.2. Object Arrangement within Cluster

Once the objects are clustered based on the packing cost of Eq. (11), each cluster contains objects that can be packed efficiently. In order to create a summary video from all objects in such a cluster, the starting play times for all objects are determined. These starting play times generate a short but easy to watch video. Since all objects in a cluster already have a similar motion, the play time is determined to minimize both total playing time and also to minimize collisions between objects. This is done using the packing cost as defined in (10). Since optimal packing is a difficult problem, the following optimization gives good results.

The technique starts with an empty set G of objects with temporal mapping. The mapping of each object into its play time is determined starting with the object having the longest duration, which is placed arbitrarily, and added to G. The technique continues with the longest object outside G, and determine its time mapping k as the time mapping which minimizes the sum over all its frames of the packing costs $Pk_{ij}(k)$ between the current object and the object in G closest to it in each of the frames. In this computation, the temporal overlap $T_{ij}(k)$ is the temporal overlap with the set G. Every object is added to G after its time mapping has been determined. This temporal mapping continues until all objects are mapped into play time. An example of such temporal arrangements is shown in FIGS. 5b-d.

Computing the packing costs $Pk_{ij}(k)$, involves computing the collisions of one object with the nearest object from a collections of objects, using the efficient approximate k-nearest neighbors algorithm and kd-tree implementation of [6]. The expected time for a NN search is logarithmic in the number of elements stored in the kd-tree.

4.3. Combining Different Clusters

The combination of different clusters is done similarly to the combination of individual objects. While objects in a cluster have their relative playing time, a global playing time is assigned to each cluster. This is performed similarly to assigning time to individual objects. An arbitrary playing time is assigned to the cluster having maximal number of objects. Next, the largest cluster with unassigned playing time is assigned a global time minimizing collision with the clusters whose time has already been assigned. This is repeated for each remaining cluster until all of the clusters have been assigned playing times.

5. Training and Testing Supervised Classifiers

Training a supervised classifier, e.g. SVM [3], requires a large training set of tagged samples. Building such a large training set is especially time consuming for surveillance video, as there are thousand of objects to classify. Clustered summaries can make the building of the training set fast and efficient.

One possible approach for building the training set is the use of unsupervised clustering to create approximate clusters. Another approach can be the tagging of a single sample, and using a nearest neighbor approach to tag other samples. While these approaches can create quickly large training sets, they have errors that need to be corrected. Clustered summaries can display in a very short time the created sets, allowing the creation large and accurate training sets with minimal effort and time.

Once a working classifier has been trained, a clustered summary is the most efficient way to test its performance. The alternative of spending many hours to watch the resulting classification is not practical.

The training set for the example in FIG. 6 has about 100 tubelets. Instead of tagging 100 tubelets individually, unsupervised clustering allowed the creation of the training set with only 10 key clicks following unsupervised clustering.

Figure 6A:
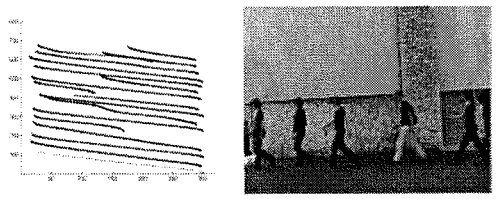
FIGS. 6a to 6e show clustered summaries of SVM classification.
Figure 6B:
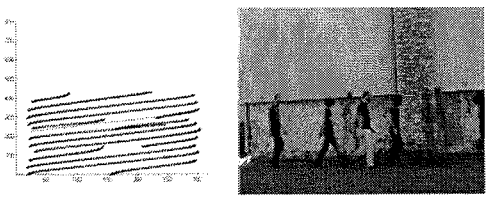
Figure 6C:
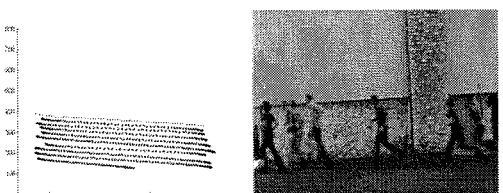
Figure 6D:
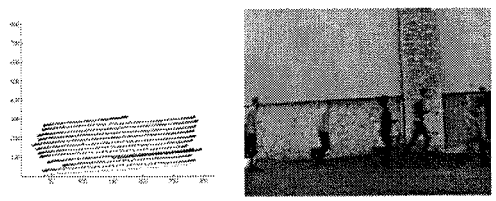
Figure 6E:
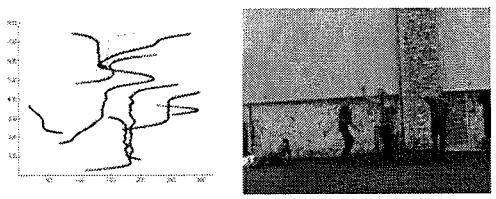

FIGS. 6a to 6e show clustered summaries of the SVM classification of 100 tubelets using motion features. A simple view of the classification results, assuming 10 seconds for each tubelet, takes about 20 minutes, while the length of the clustered summary is less than 2 minutes. The left column is the motion trajectory of the objects, and the right column is one frame from the clustered summary. The classes are as follows: FIG. 6a walking left; FIG. 6b walking right; FIG. 6c running left; FIG. 6d running right; and FIG. 6e standing and waving.

Figure 7:
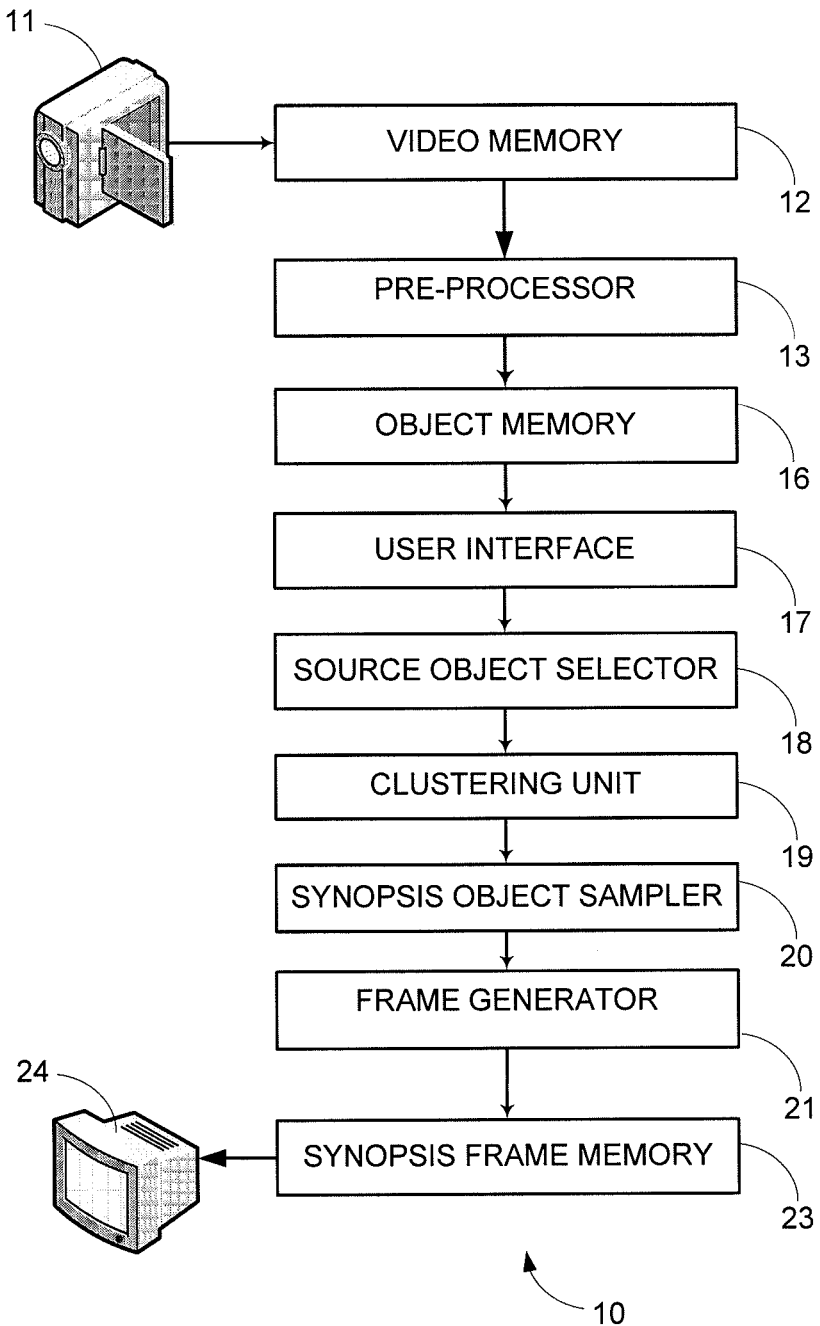
FIG. 7 is an example block diagram showing functionality of an example system for generating a compact video synopsis using a clustering method according to example embodiments of a video synopsis system.

Referring now to FIG. 7, there is shown an example block diagram of a system 10 according to the example techniques described for generating a synopsis video from a source video captured by a camera 11. The system 10 includes a video memory 12 for storing a subset of video frames of the first source video that shows movement of at least one object comprising a plurality of pixels located at respective x, y coordinates. A pre-processor 13 processes the captured video on line. The pre-processor 13 may be adapted to pre-align the video frames and store the pre-aligned video frames in the video memory 12.

The pre-processor 13 detects objects in the source video and queues the detected objects in an object memory 16. The pre-processor 13 is used when creating a synopsis video from an endless source video. When creating a synopsis video from a source video that is not endless, the pre-processor 13 may be omitted and the system may be adapted to be coupled to the object memory 16 for manipulating the object queue so as to create a synopsis video according to defined criteria.

To this end, a user interface 17 is coupled to the object memory 16 for allowing user-defined constraints to be defined. Such constraints may be used, for example, to define a time window within the source video to be summarized. It may also be used to define the required duration of the synopsis video. The user interface 17 is also used to select objects or object classes for indexing purposes. It will be appreciated that the constraints may also be predefined, in which case some embodiments of the video synopsis system will not require the user interface 17.

A source object selector 18 is coupled to the object memory 16 for selecting from the subset different source objects according to the user-defined constraints or to default constraints defined by the system. A clustering unit 19 is coupled to the source object selector 18 for clustering objects according to defined criteria, which may be specified by the user using the user interface 17. The clustering unit 19 clusters the objects into clusters such that each cluster includes objects that are similar in respect to a selected feature or a combination of features. A synopsis object sampler 20 is coupled to the clustering unit 19, for sampling from each selected source object one or more synopsis objects by temporal selection using image points derived from some selected frames. The "sampler" may be used to change the speed of individual objects. A frame generator 21 includes a cluster selector 22 that allows only selected clusters to be included in the synopsis video. The frames of the synopsis video are stored in a synopsis frame memory 23 for subsequent processing or display by a display unit 24 that displays the temporally shifted objects at their specified time and color transformation.

The system 10 may in practice be realized by a suitably programmed general purpose or a special purpose computer/computing system having a graphics card or workstation and suitable peripherals, all as are well known in the art. Accordingly, program code for implementing the embodiments described herein, including the clustering, synopsis, and other techniques, may be stored in a computer-readable medium, such as a machine-readable memory tangibly embodying a program of instructions, and executed by one or more processors of the computing system.

The embodiments described above may also use well-known or proprietary synchronous or asynchronous client-server computing techniques. However, the various components may be implemented using more monolithic programming techniques as well, for example, as an executable running on a single CPU computer system, or alternately decomposed using a variety of structuring techniques known in the art, including but not limited to, multiprogramming, multithreading, client-server, or peer-to-peer, running on one or more computer systems each having one or more CPUs. Some embodiments execute concurrently and asynchronously and communicating using message passing techniques. Equivalent synchronous embodiments are also supported. In addition, programming interfaces to the summarization and other data can be available by standard means such as through C, C++, C#, and Java APIs; libraries for accessing files, databases, or other data repositories; through scripting languages such as XML; or through Web servers, FTP servers, or other types of servers providing access to stored data.

Also the computing system may be implemented in a distributed environment comprising multiple, even heterogeneous, computer systems and networks. Also, one or more of the components may themselves be distributed, pooled or otherwise grouped, such as for load balancing, reliability or security reasons. Different configurations and locations of programs and data are contemplated for use with techniques of described herein.

Furthermore, in some embodiments, some or all of the components of the may be implemented or provided in other manners, such as at least partially in firmware and/or hardware, including, but not limited to one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the system components and/or data structures may also be stored (e.g., as executable or other machine readable software instructions or structured data) on a computer-readable medium (e.g., a hard disk; a memory; a network; or a portable media article to be read by an appropriate driver or via an appropriate connection). Some or all of the system components and data structures may also be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 8:
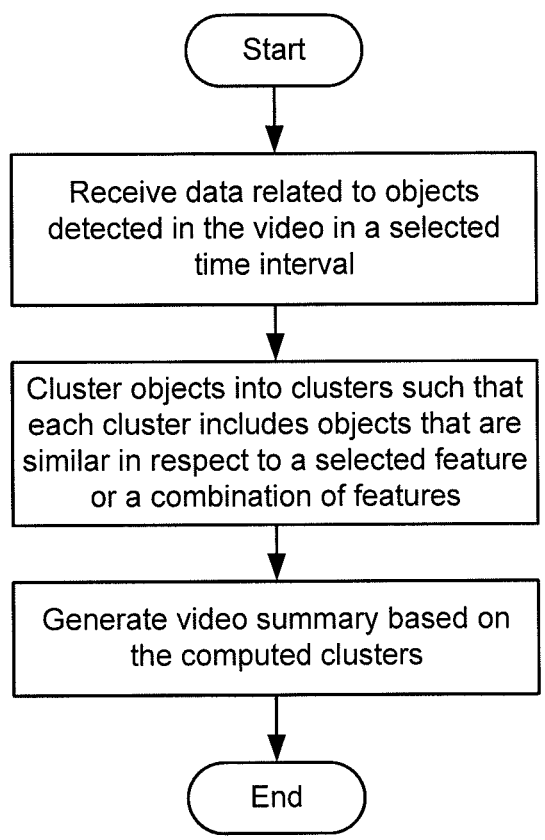
FIG. 8 is an example flow diagram showing the principal operations carried out by an example method for unsupervised spectral clustering.

FIG. 8 is a flow diagram showing the principal operation carried by the system 10 in accordance with example embodiments.

Concluding Remarks

The clustered summaries techniques described herein serve as an efficient method to browse and search surveillance video. Surveillance videos are very long (actually they are endless), and include many thousands of objects. Regular browsing is practically impossible. In clustered summaries, multiple objects having similar motion are shown simultaneously. This enables to view all objects in a much shorter time, without losing the ability to discriminate between different activities. Summaries of thousands of objects can be created in a few minutes (not counting object extraction time).

In addition to efficient viewing of all objects in the surveillance video, clustered summaries are important for creating examples for classifiers. Multiple examples can be prepared and given to the learning mechanisms very quickly using unsupervised clustering and clustered summaries. Even a simple nearest neighbor classifier can initially be used, cleaned up using clustered summaries, and the results given to learning classifiers.

Clustered summaries can also be used for video browsing. Instead of spending many hours to watch the captured video, the clustered summaries methodology enables to browse the video archive quickly and efficiently, and focus on a smaller set of interesting objects. Browsing can be done by hierarchical application of clustered summaries. The user first selects an interesting cluster, and then zooms-in on this cluster to identify the interesting objects in it. Or the user can select irrelevant clusters and remove their objects from the summary. The user may continue browsing by "cleaning" the cluster using a supervised classifier, or by simply selecting some nearest neighbors.

All of the above U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 61/116,646 filed Nov. 21, 2008, entitled "Clustered Synopsis" is incorporated herein by reference, in its entirety.

From the foregoing it will be appreciated that, although specific embodiments have been described herein for purposes of illustration, various modifications may be made without deviating from the spirit and scope of the present disclosure. Also, the methods and systems discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A method of summarizing a source video sequence, said method comprising:
   obtaining a source video being a sequence of video frames which presents two or more source objects that are moving relative to a background;
   receiving features descriptive of selected source objects presented in the source video sequence over a selected time interval, wherein the source objects represent moving objects appearing in the source video;
   clustering the source objects into clusters such that each one of the clusters includes source objects that are similar in respect to one of the features or a combination of the features;
   selecting one or more of the clusters, and further selecting source objects only from the selected one or more clusters
   generating synopsis objects by sampling respective source objects;
   generating a synopsis video only from the selected synopsis objects wherein the synopsis video has a playing time which is shorter than the playing time of the source video,
   wherein two or more synopsis objects which are played at least partially simultaneously in the synopsis video, are generated from source objects that are captured at different times in the source video,
   wherein two or more synopsis objects which are played at different times in the synopsis video are generated from source objects that are captured at least partially simultaneously in the source video.

2. The method of claim 1, further comprising computing a temporal arrangement of some of the source objects in smaller corresponding synopsis video sequences, each associated with a single cluster, prior to the generating of the synopsis video sequence.

3. The method of claim 2, wherein the generated synopsis video sequence is created by rearranging the temporal arrangement between selected clusters, while keeping the previously computed temporal arrangement of objects inside each cluster.

4. The method of claim 1, wherein the synopsis video summary sequence is based on a subset of clusters selected by: (i) viewing their summaries or (iii) selecting individual objects that are members in these clusters.

5. The method of claim 1, when the generated summary is made by selecting a predetermined number or a predetermined ratio of objects from each cluster.

6. The method of claim 1, including further comprising displaying a new synopsis video sequence that includes all objects in one of the clusters.

7. The method of claim 1, wherein the features include image appearance of the source objects and space-time trajectory of the source objects.

8. The method of claim 1, wherein the synopsis video sequence is usable selecting objects for training automatic objects classifiers.

9. The method of claim 1, wherein the synopsis video sequence is usable for testing performance of automatic object classifiers.

10. The method of claim 1, further comprising: computing additional features for at least some of the source objects prior to the clustering.

11. A computer program product for summarizing a source video sequence, the computer program product comprising:
   a non-transitory computer readable medium having computer readable program embodied therewith, the computer readable program comprising:
   computer readable program configured to obtain a source video being a sequence of video frames which presents two or more source objects that are moving relative to a background;
   computer readable program configured to receive features descriptive of selected source objects presented in the source video sequence over a selected time interval, wherein the source objects represent moving objects appearing in the source video;
   computer readable program configured to cluster the source objects into clusters such that each one of the clusters includes source objects that are similar in respect to one of the features or a combination of the features;

computer readable program configured to select one or more of the clusters, and further select source objects only from the selected one or more clusters;

computer readable program configured to generate synopsis objects by sampling respective source objects;

computer readable program configured to generate a synopsis video only from the selected synopsis objects wherein the synopsis video has a playing time which is shorter than the playing time of the source video, wherein two or more synopsis objects which are played at least partially simultaneously in the synopsis video, are generated from source objects that are captured at different times in the source video, wherein two or more synopsis objects which are played at different times in the synopsis video are generated from source objects that are captured at least partially simultaneously in the source video.

12. A system for summarizing a source video sequence, the system comprising:

a computer processor configured to obtain a source video being a sequence of video frames which presents two or more source objects that are moving relative to a background;

a source object selector executed by the computer processor and configured receive features descriptive of selected source objects presented in the source video sequence over a selected time interval, wherein the source objects represent moving objects appearing in the source video;

a clustering unit executed by the computer processor and configured to cluster the source objects into clusters such that each one of the clusters includes source objects that are similar in respect to one of the features or a combination of the features, wherein the source object selector is further configured to select one or more of the clusters, and further select source objects only from the selected one or more clusters;

a sampler executed by the computer processor configured to generate synopsis objects by sampling respective source objects; and a frame generator executed by the processor and configured to generate a synopsis video only from the selected synopsis objects;

wherein the synopsis video has a playing time which is shorter than the playing time of the source video, wherein two or more synopsis objects which are played at least partially simultaneously in the synopsis video, are generated from source objects that are captured at different times in the source video, wherein two or more synopsis objects which are played at different times in the synopsis video are generated from source objects that are captured at least partially simultaneously in the source video.

* * * * *